United States Patent [19]
Chou

[11] Patent Number: 5,608,951
[45] Date of Patent: *Mar. 11, 1997

[54] STRAP LOCKING DEVICE

[76] Inventor: An-Chuan Chou, No. 212, Yung An Street, Tainan, Taiwan

[*] Notice: The term of this patent shall not extend beyond the expiration date of Pat. No. 5,440,790.

[21] Appl. No.: 509,112

[22] Filed: Aug. 1, 1995

Related U.S. Application Data

[63] Continuation-in-part of Ser. No. 155,789, Nov. 23, 1993, Pat. No. 5,440,790.

[51] Int. Cl.$^6$ ..................................................... B65B 11/00
[52] U.S. Cl. ........................... 24/302; 24/68 CD; 24/309; 410/117
[58] Field of Search .............................. 410/96, 97, 117, 410/118; 24/302, 301, 265 BC, 308, 309, 307, 315, 170, 171

[56] References Cited

U.S. PATENT DOCUMENTS

| | | |
|---|---|---|
| 379,374 | 3/1988 | Day .................................. 24/315 |
| 5,440,790 | 8/1995 | Chou ............................. 410/117 X |

*Primary Examiner*—James R. Brittain
*Attorney, Agent, or Firm*—Morton J. Rosenberg; David I. Klein

[57] ABSTRACT

A strap locking device for binding freight, or goods loaded on a truck is provided. The locking device includes a plurality of strap length adjustment devices, or strap adjustment devices mixed with a simple strap hanger. Straps of adjustable length are combined with each strap adjustment device to be clamped and thereby stably bind freight loaded on a truck. A hook is secured to a distal end of each strap for engagement with a respective hook of the truck.

5 Claims, 10 Drawing Sheets

STRAP LOCKING DEVICE

CROSS REFERENCE TO RELATED PATENT APPLICATIONS

This Patent Application is a Continuation-In-Part of the patent application Ser. No. 08/155,789, filed 23 Nov. 1993, entitled Strap Locking Device now U.S. Pat. No. 5,440,790.

BACKGROUND OF THE INVENTION

1. Field of the Invention

This invention directs itself to a device for binding freight. In particular, this invention directs itself to a plurality of strap members secured to a plurality of respective attachment members, each attachment member having a base plate, with the base plates being overlapped and pivotally secured one to another by a pivot pin.

2. Prior Art

Straps of rather large size or round strong rubber straps are commonly used for firmly binding freight, goods or merchandise loaded on a truck or pick-up for transport. It is extremely inconvenient to bind bulky freight and takes considerable time and labor to accomplish with conventional methods.

The best prior art Known to Applicant includes U.S. Pat. Nos. 2,442,266; 5,123,153; 5,144,724; 5,173,996; 5,193,955; 2,932,871; 4,770,459; 2,845,676; 4,906,023; 4,667,904; 1,934,697; 3,173,539; 4,886403; and 3,961,585. Applicant is also aware of the following Foreign Patent Documents: United Kingdom #2,178,472; Soviet Union #1,220,967 and #1,650,489; German #2,059,321 and #2,839,305; French #1,028,058; and, Swiss #151,009.

SUMMARY OF THE INVENTION

This invention has been devised to offer a kind of strap locking device for binding freight, goods or merchandise loaded on a truck or a pick-up which requires little time and labor to accomplish.

The strap locking device in the present invention includes a plurality of strap stoppers or strap buckles pivotally combined together. An equal number of straps of adjustable length are combined with the strap stoppers to be adjustably clamped by the stoppers, so as to adjust the length of the straps used to bind freight, goods or merchandise loaded on a truck or pick-up. A distal end of each strap is coupled to a hook, the hook being intended for engagement with a respective hook of the truck or a pick-up, so that the straps can be stretched tightly therefrom.

One of the strap stoppers or buckles of the strap locking device can be replaced by a simple strap hanger having only a slot for binding one end of a strap of a predetermined length and the other end thereof coupled to a hook for engagement with a respective hook of the truck or pick-up.

BRIEF DESCRIPTION OF THE DRAWINGS

The invention will be better understood by reference to the accompanying drawings, wherein.

DESCRIPTION OF THE PREFERRED EMBODIMENTS

Figures 1, 2:
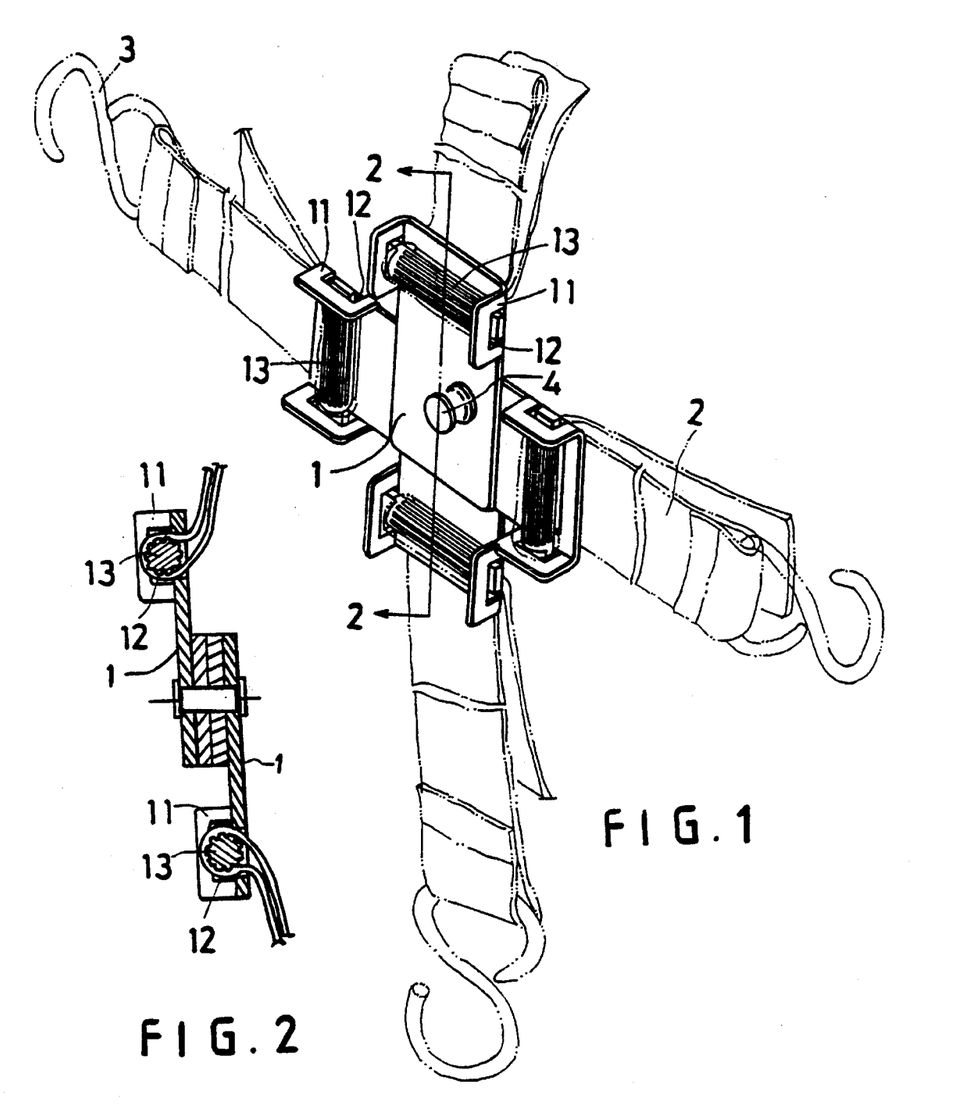
FIG. 1 is a perspective view of a first embodiment of a strap locking device of the present invention.
FIG. 2 is a sectional view taken along the line 2—2 of FIG. 1 of the present invention.

A first embodiment of a strap locking device, as shown in FIGS. 1 and 2, includes four strap stoppers or attachment members 1, four straps 2, and four hooks 3 and a pin 4 combined together.

Each strap stopper 1 has two opposite side walls 11, 11 bent up from a bottom or base plate, a slot 12 in each side wall 11, and a stop rod 13 having its two opposing ends with a planar contour to fit loosely in respective slots 12, 12 and permit a limited amount of displacement therein. Each stop rod 13 has an intermediate round portion with a rough outer surface for stopping a respective strap 2 wound thereon, when the strap 2 is tensioned. The strap 2 has one end, the distal end, coupled to a hook and the opposing free end threaded through the stopper 1. The length of the strap, from the distal end to the stop rod 13 can be adjusted. The bottom plate of each strap stopper 1 has an extended portion for overlaying the extended bottom plate portions of the other three stoppers 1. A pivot pin 4 is inserted through respective aligned through openings of each bottom plate for coupling the four stoppers 1 together, allowing the four stoppers 1 to extend in four directions, spaced at right angles 90, but being pivotally displaceable. The pivotal coupling provided by pivot pin 4 permits radial of one stopper 1 relative to another stopper 1. The radial displaceability of the stoppers 1 is very important, since it allows the straps 2 to properly overlay the cargo being secured, which takes many forms and have varying shapes and contours. By virtue of the pivotal coupling between the stoppers 1, the tension force transmitted by the strap to the attachment member can be evenly applied across the width of the respective straps. Without such pivotal displacement capability, the radial displacement of a strap causes a greater tensile force, or the entire tensile force, to be applied to one side of the strap, at its coupling with the attachment member, as compared to the other side of the strap. Such uneven force loading leads to frying of the straps and their eventual failure. By use of the pivotal connection between stoppers 1, the aforementioned failure mode is obviated. Thus, each stopper 1 is rotatable about the pivot pin 4 and thereby able to be maintained in radially aligned relationship with the respective strap member coupled thereto, to provide a uniform distribution of the tensile forces applied therebetween.

Figure 3:
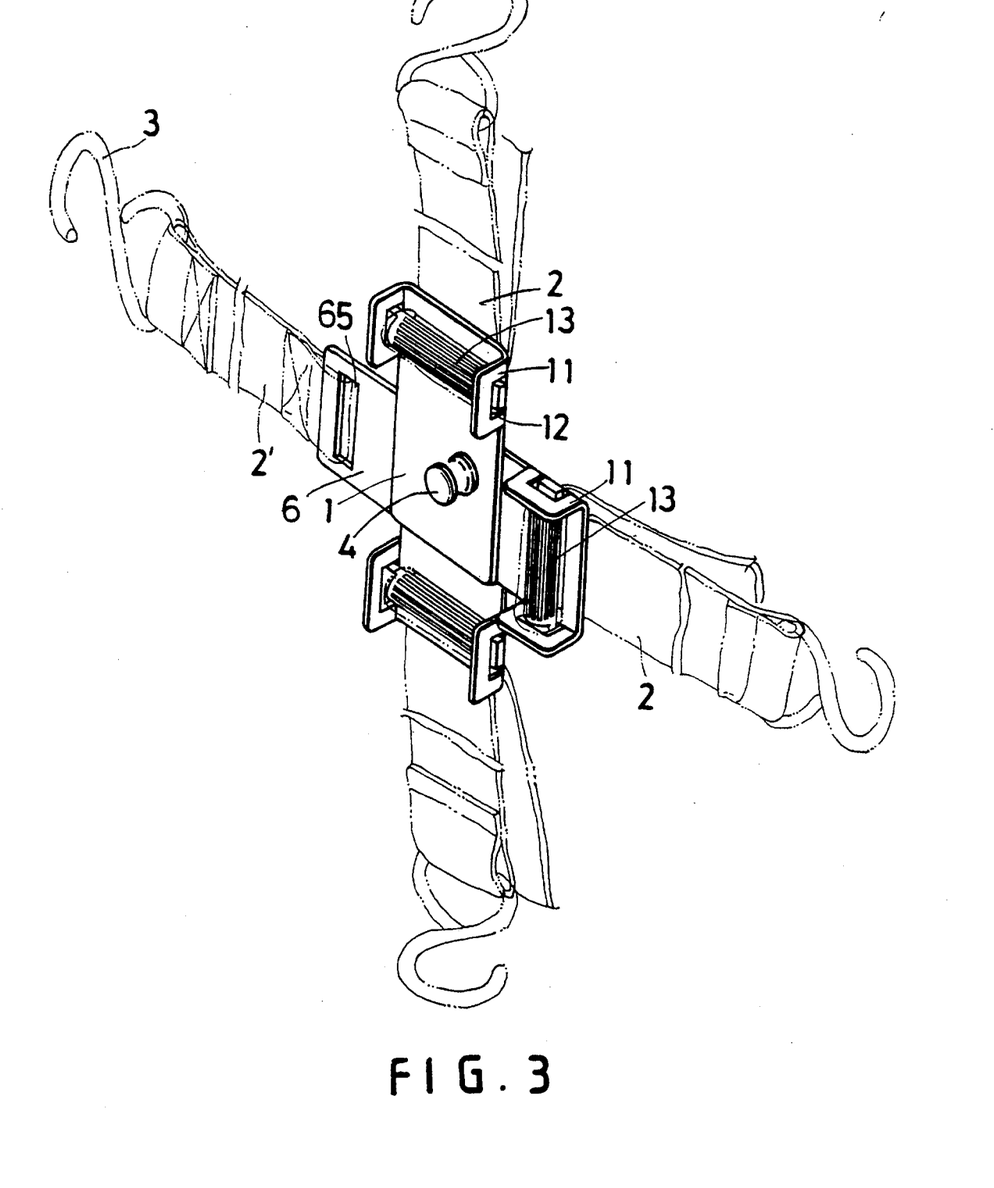
FIG. 3 is a perspective view of a second embodiment of the strap locking device of the present invention.

A second embodiment of the strap locking device, as shown in FIG. 3, includes three strap stoppers 1, one strap hanger 6, three straps 2 of adjustable length, one strap 2' of a predetermined length, four hooks 3 and a pivot pin 4, combined pivotally together. The strap stoppers 1 and the three straps 2 are structured the same as those of the first embodiment. The strap hanger 6 is formed by a rectangular plate having a slot 65 formed therethrough adjacent one end of the rectangular plate. The end of strap 2' passes through the slot 65 and is folded over a portion of the strap and sewn together to surround the end of the hanger 6 to secure the strap 2' firmly thereto. The distal end of the strap 2' is secured to the hook 3. Hanger 6 and the three stoppers 1 are secured together by pin 4, as in the first embodiment.

Figure 4:
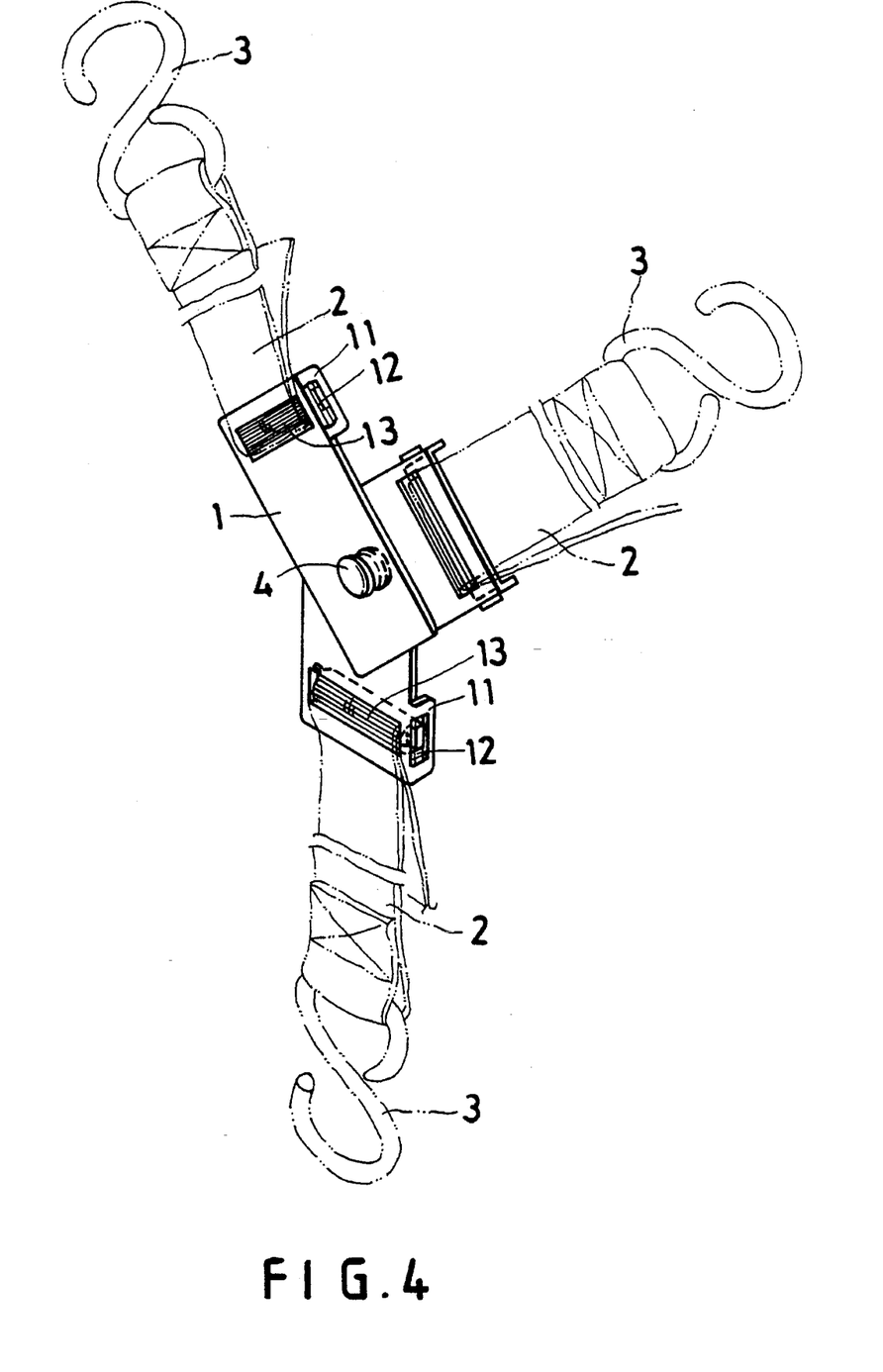
FIG. 4 is a perspective view of a third embodiment of the strap locking device of the present invention.

A third embodiment of the strap locking device, as shown in FIG. 4, includes three strap stoppers 1, three straps 2, three hooks 3, and a pivot pin 4, pivotally combined together. The stoppers 1, straps 2, hooks 3 and the pivot pin 4 are all the same as those described in the first embodiment. The stoppers 1 are spaced apart in three directions, at different angles from those of the first embodiment, and firmly, but pivotally affixed together by means of the pivot pin 4.

Figure 5:
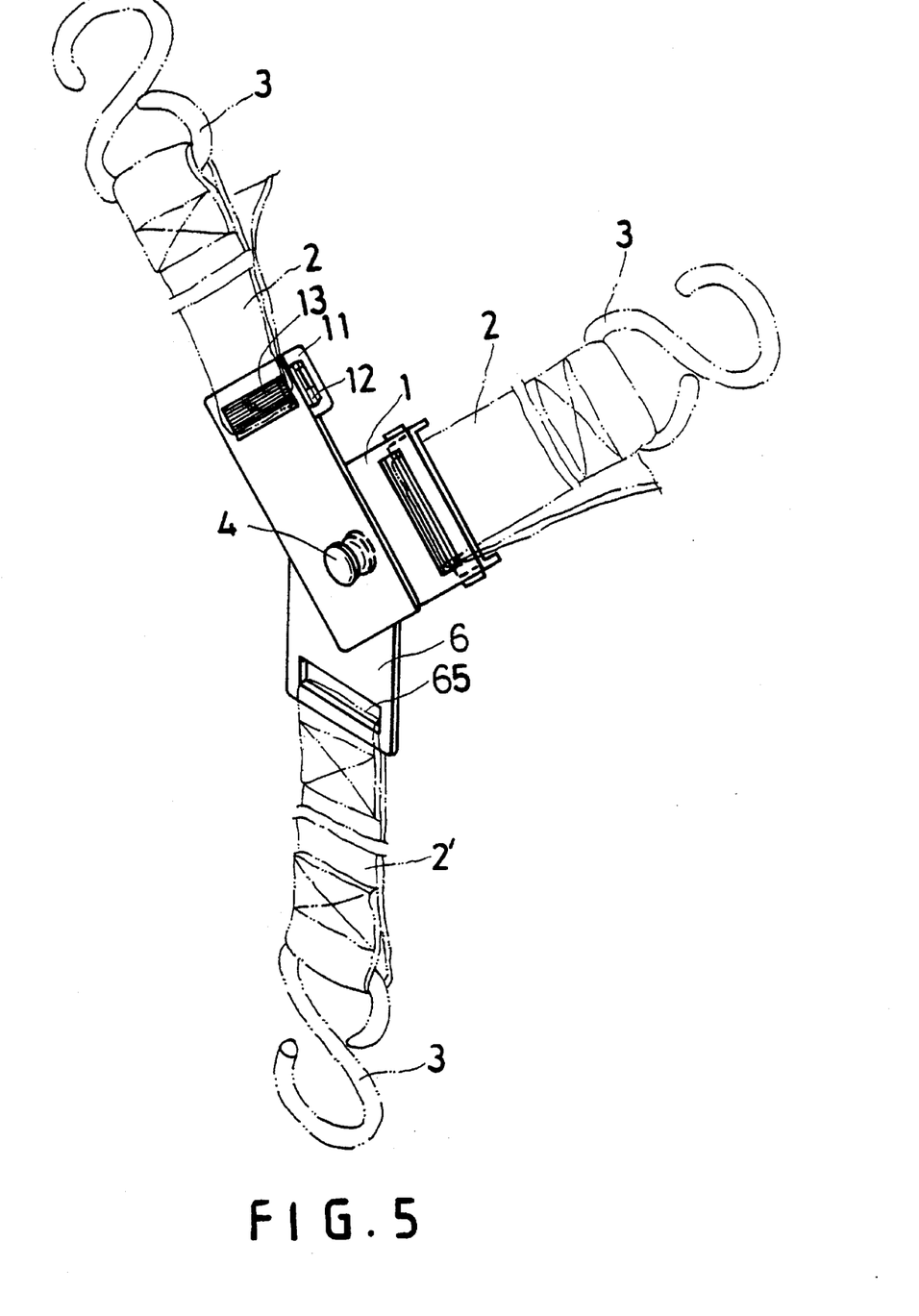
FIG. 5 is perspective view of a fourth embodiment of the strap locking device of the present invention.

A fourth embodiment of the strap locking device, as shown in FIG. 5, includes two strap stoppers 1, 1, a strap hanger 6, two straps 2, 2 of adjustable length, a strap 2' of a predetermined length, three hooks 3 and a pivot pin 4, pivotally combining the two stoppers 1, 1 and the hanger 6 together. The stoppers 1, 1, the two straps 2, 2, the three hooks 3 and the pivot pin 4 are the same as those disclosed relative to the first embodiment.

Figure 6:
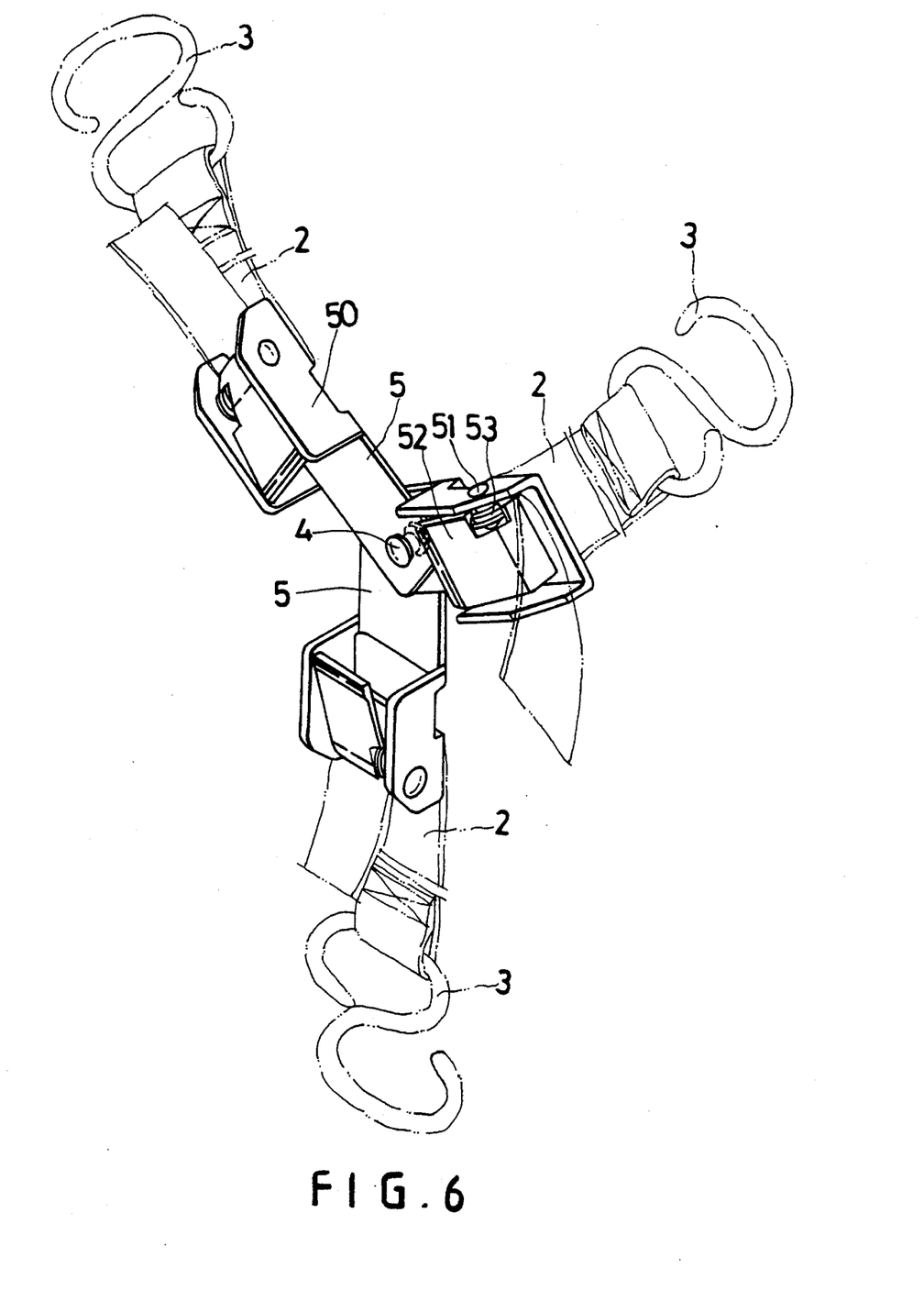
FIG. 6 is a perspective view of a fifth embodiment of the strap locking device of the present invention.

A fifth embodiment of the strap locking device, as shown in FIG. 6, includes three buckles 5, three straps 2 of adjustable length, three hooks 3 and a pin 4, pivotally combining the three buckles 5 together. Each buckle 5 has two opposing side walls 50, 50 bent up from a bottom plate. A push plate 52 is pivotally sustained between the two side walls 50, 50 by means of a rod shaped pin 51. A torque spring 53 is disposed around the pin 51 to bias the push plate 52 such that one end of the push plate will apply a compressive force between a respective portion of a strap 2 and the bottom plate so as to lock down the strap 2, which extends between the push plate 52 and the bottom plate. When the other end of the push plate 52 is pressed, the end compressing the strap 2 is displaced, freeing the strap 2 to permit adjustment of its length to be clamped by the push plate 52. Each strap 2 has its distal end coupled to a hook 3.

Figure 7:
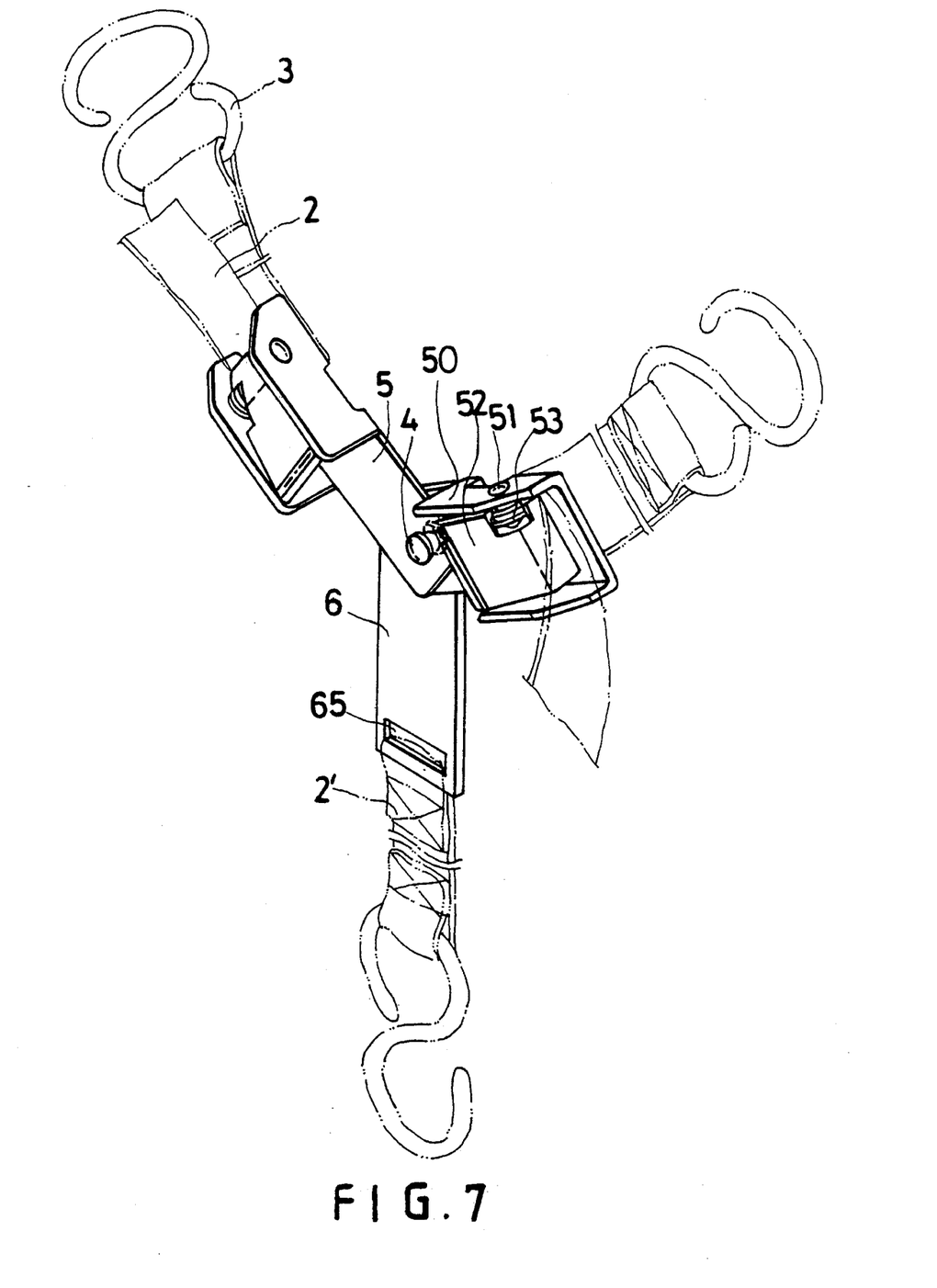
FIG. 7 is a perspective view of a sixth embodiment of the strap locking device of the present invention.

A sixth embodiment of the strap locking device, as shown in FIG. 7, includes, in combination, two buckles 5, 5, a strap hanger 6, two straps 2, 2 of adjustable length, a strap 2' of predetermined length, three hooks 3 and a pivot pin 4. The two buckles 5, 5, the straps 2, 2, the hooks 3 and the pin 4 are the same as those disclosed in the fifth embodiment. The strap hanger 6 and the strap 2' are the same as those disclosed relative to the fourth embodiment. The pivot pin 4 provides for radial displaceability of the buckles 5,5 and strap hanger 6.

Figure 8:
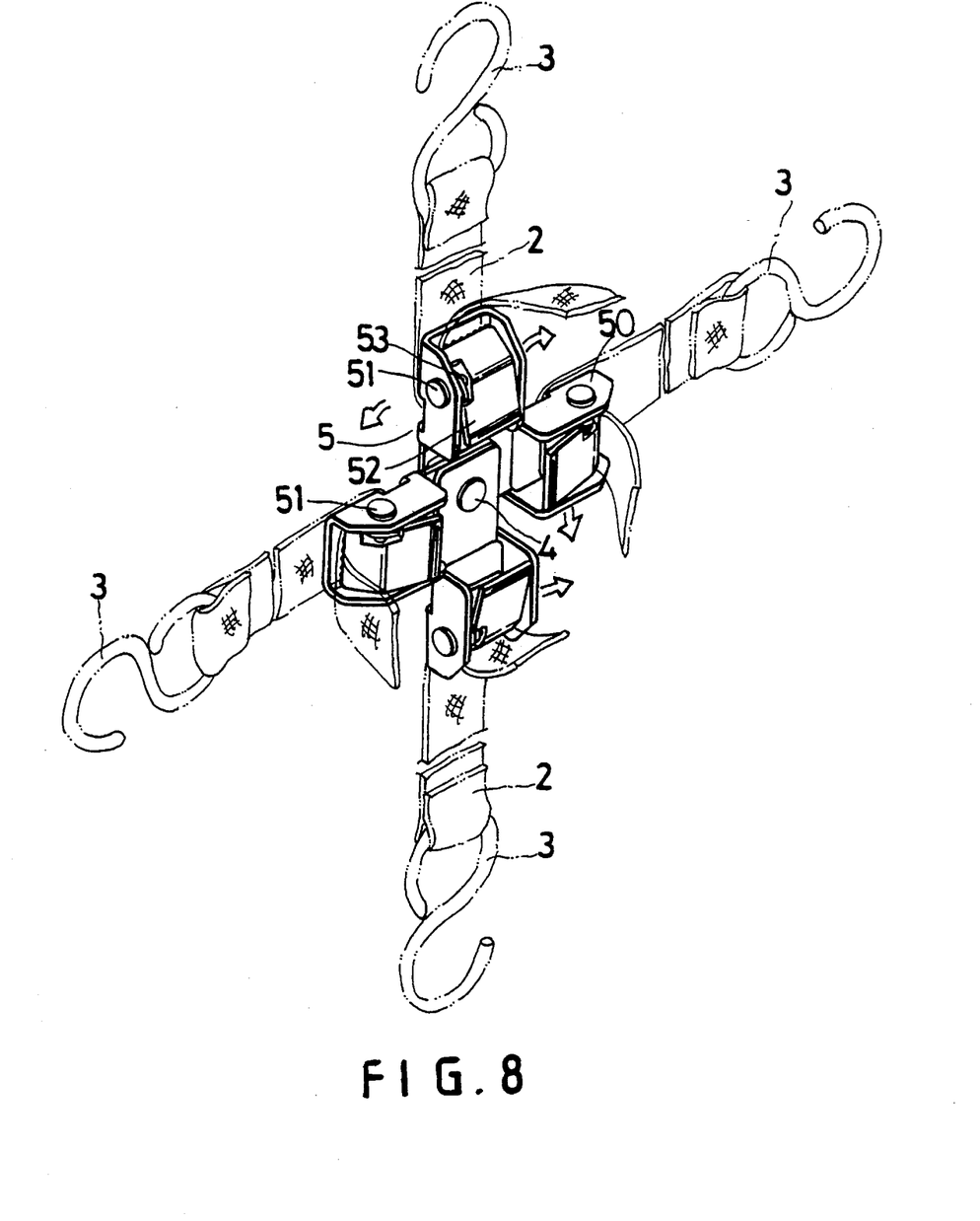
FIG. 8 is a perspective view of a seventh embodiment of the strap locking device of the present invention.

A seventh embodiment of the strap locking device, as shown in FIG. 8, includes four buckles 5 pivotally coupled in a cross-shape by means of the pivot pin 4, four straps 2 of adjustable length, and four hooks 3, each hook coupled to a distal end of respective strap 2. The buckles 5, the straps 2, the hooks 3 and the pivot pin 4 are the same as those disclosed with respect to the fifth embodiment.

Figure 9:
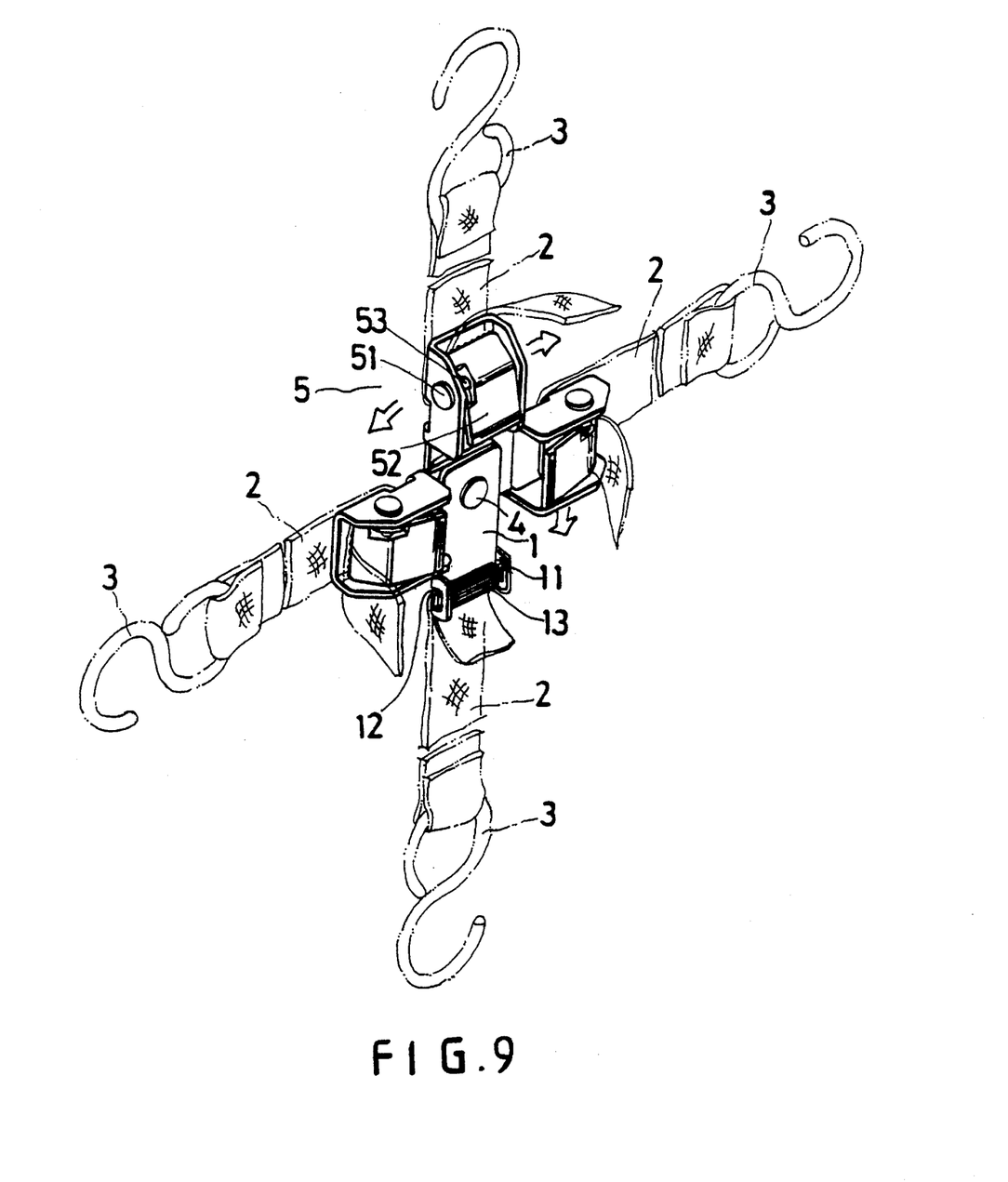
FIG. 9 is a perspective view of an eighth embodiment of the strap locking device of the present invention.

An eighth embodiment of the strap locking device, as shown in FIG. 9, includes three buckles 5, a strap stopper 1, four straps 2, four hooks 3 and a pin 4 pivotally combining the three buckles 5 and the stopper 1 together. The three buckles 5, the four straps 2, the hooks 3 and the pivot pin 4 are the same as those disclosed relative to the fifth embodiment. The strap stopper 1 is the same element disclosed in the first embodiment.

Figure 10:
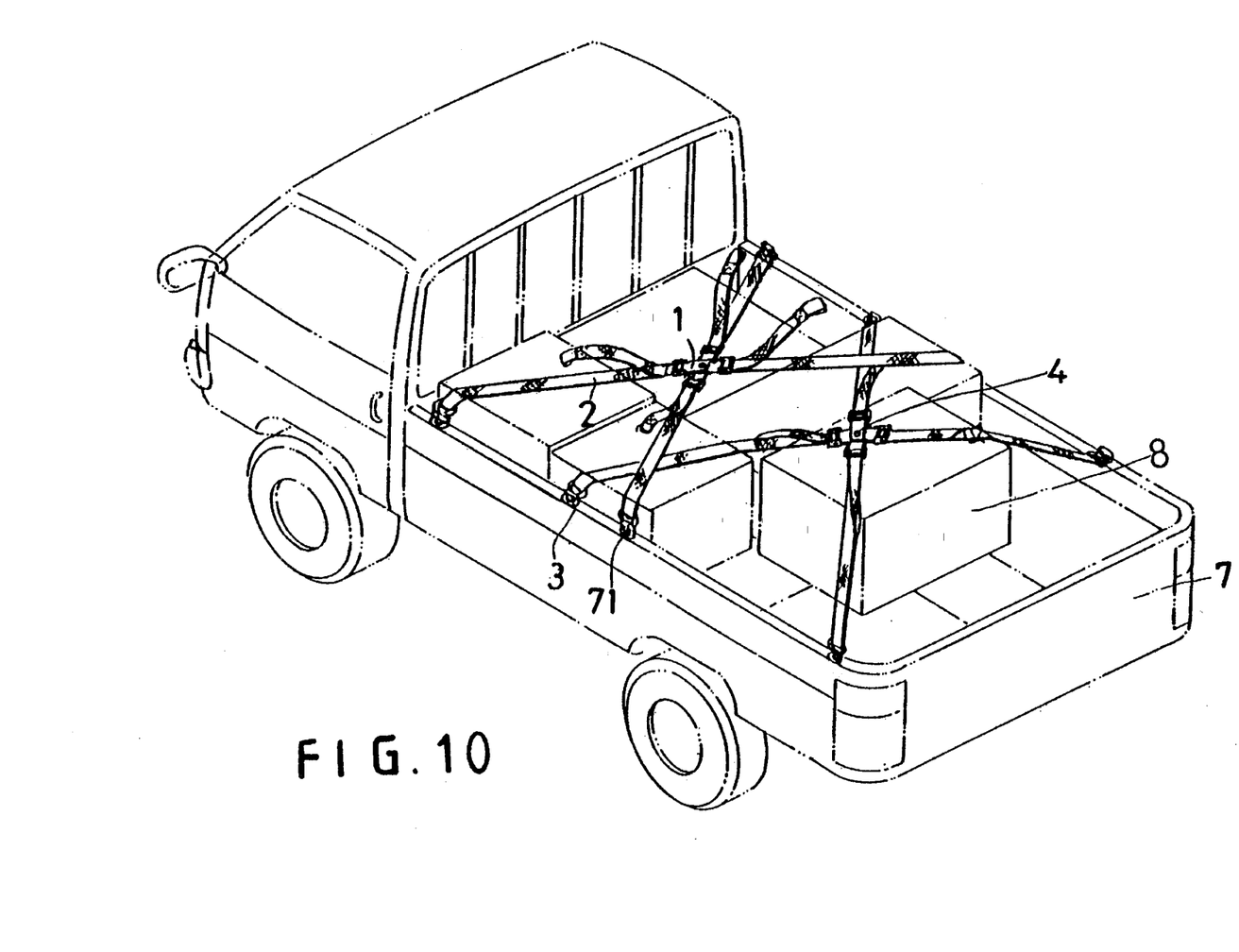
FIG. 10 is a perspective view of the application of either the first, the second, the seventh or the eighth embodiment of the strap locking device of the present invention; and, FIG. 11 is a perspective view of the application of either the third, the fourth, the fifth or the sixth embodiment of the strap locking device of the present invention.
Figure 11:
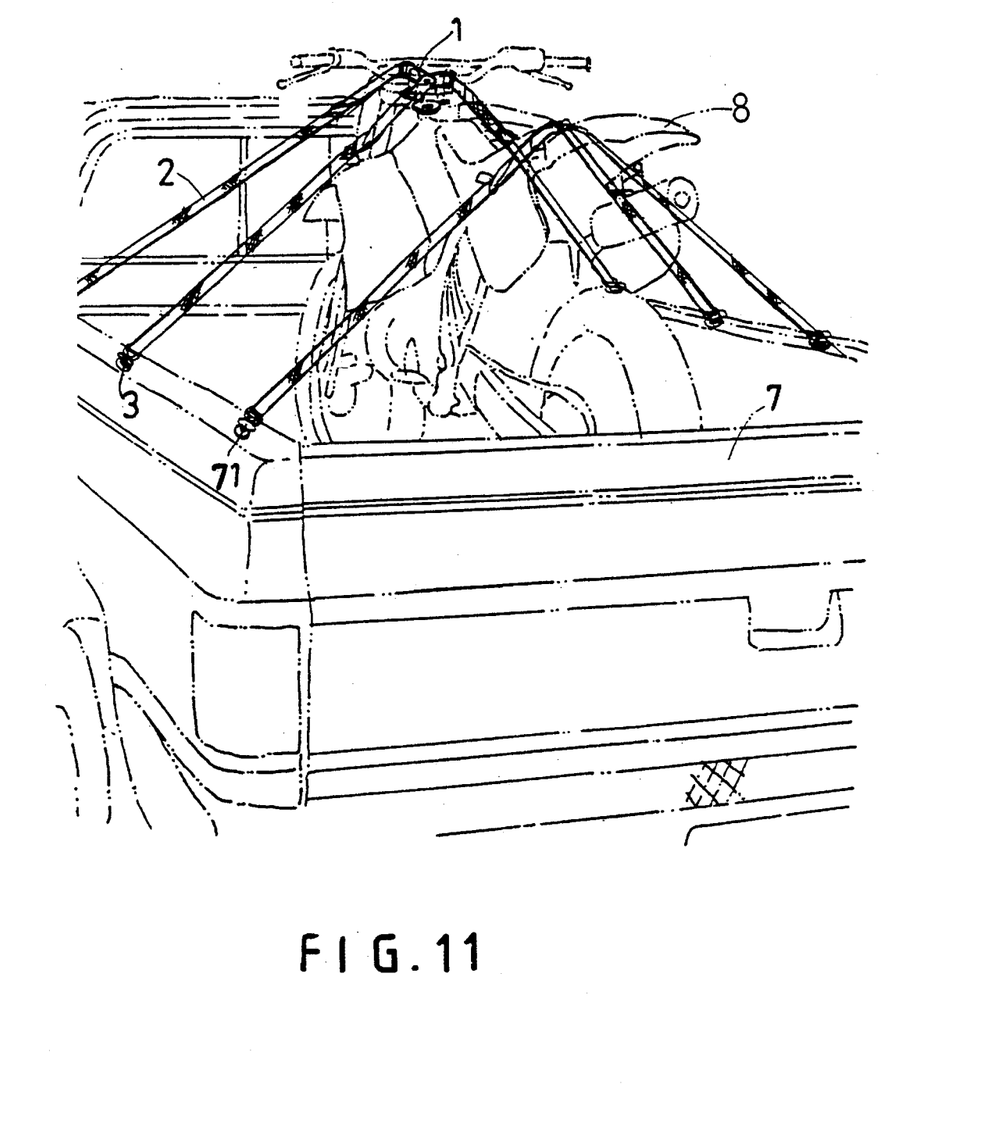

The method by which the strap locking device is used is shown in FIGS. 10 and 11, in which various embodiments of the instant invention are selected for stably binding freight 8 loaded on a truck or a pick-up 7, with the straps 2 of adjustable length and the strap 2' of predetermined length properly laid on the freight. The hooks 3 are engaged with respective hooks 71 of the truck or a pick-up 7. A user can choose to use any of the various embodiments of the strap locking devices for binding freight, goods or merchandise, depending on the form or the condition of the freight to be secured.

While the preferred embodiments of the invention have been described above, it will be recognized and understood that various modifications may be made therein and the appended claims are intended to cover all such modifications which may fall within the spirit and scope of the invention.

What is claimed is:

1. A strap locking device for use in binding freight, comprising:

a plurality of strap members, each of said plurality of strap members having opposing first and second ends;

a plurality of strap hook members, each of said plurality of strap hook members being fixedly coupled to a first end of a respective one of said plurality of strap members;

means for securing each of said plurality of strap members one to another at a respective section of each said strap member displaced from said first end thereof, said securing means including (1) a plurality of attachment members, each of said attachment members having a longitudinally extended base plate coupled to a respective one of said plurality of strap members adjacent a first end of said base plate, said base plate having an opening formed therethrough adjacent a second end thereof, and (2) a pivot pin member extending through said through opening of each said base plate to provide a pivotal coupling of each of said plurality of attachment member base plates one to another for relative rotative displacement therebetween, said plurality of attachment member base plates being disposed in radially spaced relationship, whereby said plurality of strap members are directed in different directions from said securing means over freight for engagement of said plurality of hooks with corresponding fasteners of a freight transport.

2. The strap locking device as recited in claim 1 where said securing means further includes means for adjustably and releasably securing at least a portion of said plurality of strap members to a respective portion of said plurality of attachment members.

3. The strap locking device as recited in claim 2 where said means for adjustably and releasably securing includes a plurality of push plate members, each of said plurality of push plate members being pivotally coupled to a respective one of said portions of said plurality of attachment members, each of said push plate members having an end portion disposed adjacent a respective base plate for compressively engaging a selected section of a respective strap member between said end portion and said base plate responsive to an opposing end of said push plate member being displaced in a first direction and disengaged therefrom responsive to said push plate member being displaced in a second opposing direction.

4. The strap locking device as recited in claim 3 where one of said attachment members is formed with a slotted through opening adjacent said second end of said base plate for fixedly coupling said second end of a respective one of said plurality of strap members thereto and thereby fixing a length dimension between a respective strap hook member and said slotted through opening to a predetermined value.

5. The strap locking device as recited in claim 2 where said means for adjustably and releasably securing includes a plurality of stop rod members, each of said plurality of stop rod members being slidably coupled to a respective one of said portions of said plurality of attachment members, each of said stop rod members being disposed above a slotted through opening formed in a respective base plate for passage of a selected section of a respective strap member through said base plate, over said stop rod and back through said slotted opening.

* * * * *